United States Patent
Giusto et al.

(10) Patent No.: US 12,026,165 B2
(45) Date of Patent: Jul. 2, 2024

(54) COOPERATIVE SYSTEM ARCHITECTURE FOR ENGINEERING ASSET MANAGEMENT AND SHARING

(71) Applicant: GM Global Technology Operations LLC, Detroit, MI (US)

(72) Inventors: Paolo Giusto, Brentwood, CA (US); Roy J. Mathieu, Rochester Hills, MI (US); Ramesh Sethu, Troy, MI (US); Prakash M. Peranandam, Rochester Hills, MI (US); Arun Adiththan, Sterling Heights, MI (US); Shige Wang, Northville, MI (US); Farui Peng, Sterling Heights, MI (US); Bakhtiar B. Litkouhi, Washington, MI (US); Wenyuan Qi, Shanghai (CN); Osman Eser Atesoglu, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

(21) Appl. No.: 17/823,315

(22) Filed: Aug. 30, 2022

(65) Prior Publication Data
US 2024/0054134 A1 Feb. 15, 2024

(30) Foreign Application Priority Data
Aug. 12, 2022 (CN) .......................... 202210971372.3

(51) Int. Cl.
G06F 16/2457 (2019.01)
G06F 16/23 (2019.01)
G06Q 10/0875 (2023.01)

(52) U.S. Cl.
CPC ...... *G06F 16/2457* (2019.01); *G06F 16/2358* (2019.01); *G06F 16/2365* (2019.01); *G06Q 10/0875* (2013.01)

(58) Field of Classification Search
None
See application file for complete search history.

(56) References Cited

U.S. PATENT DOCUMENTS

| | | | |
|---|---|---|---|
| 11,450,046 B1* | 9/2022 | Diks | G06Q 20/065 |
| 2009/0006268 A1* | 1/2009 | Tanner | G06Q 30/02 705/36 R |
| 2014/0372192 A1* | 12/2014 | Circe | G06Q 30/02 705/14.19 |

(Continued)

*Primary Examiner* — Thu N Nguyen
(74) *Attorney, Agent, or Firm* — Vivacqua Crane, PLLC (57) ABSTRACT

A computing system including a cooperative system architecture for cataloging, informing, sharing, and managing engineering assets within an organization includes a user management subsystem for creating a registered user profile associated with a specific user of the computing system. The registered user profile includes user metadata that provides identifying characteristics of the specific user. The computing system includes an asset management subsystem including an asset repository for recording one or more engineering assets. The asset management subsystem modifies the user metadata of the registered user profile in response to the specific user recording an engineering asset in the asset repository. The computing system includes a test management subsystem including a test repository for recording one or more test bill of materials.

20 Claims, 5 Drawing Sheets

(56) References Cited

U.S. PATENT DOCUMENTS

2020/0204557 A1\* 6/2020 Singh .................... H04L 67/306
2021/0117312 A1\* 4/2021 Wright ................ G06F 16/2379
2022/0358185 A1\* 11/2022 Newman ............... G06F 16/211

\* cited by examiner

COOPERATIVE SYSTEM ARCHITECTURE FOR ENGINEERING ASSET MANAGEMENT AND SHARING

INTRODUCTION

The present disclosure relates to a computing system that includes a cooperative system architecture composed of a user management subsystem, an asset management subsystem, and a test management subsystem for cataloging, informing, sharing, and managing engineering assets within an organization.

Sharing engineering assets, which are also referred to as test assets, and test bills of materials within an organization, such as a corporation, may become challenging. This is especially relevant as a corporation grows in size and employees become increasingly specialized. Indeed, many employees within a large corporation, which includes employees of the corporation's suppliers, may have a silo mindset, which is a reluctance to share engineering assets with other employees in different departments or divisions in the same company, or with suppliers.

The lack of sharing engineering assets within an organization may reduce efficiency and create duplicated efforts throughout the organization. Many employees may have insufficient knowledge regarding existing assets, test scenarios, and verification and validation procedures that already exist within a corporation, which may result in duplicated test assets and test scenario creation as well as longer lead times. Specifically, for example, two different employees that work in two separate departments or divisions within the same organization may independently develop their own controller software model, which duplicates effort and also creates non-heterogeneous assets and test scenarios within the organization. Furthermore, it is to be appreciated that some organizations may not incentivize or reward employees for sharing existing assets and test scenarios with other employees and suppliers. Therefore, employees may not be motivated to share existing assets with other members of their organization.

Thus, while current systems for sharing engineering assets within an organization achieve their intended purpose, there is a need in the art for an improved approach for sharing and managing assets within and outside of an organization.

SUMMARY

According to several aspects, a computing system including a cooperative system architecture for cataloging, informing, sharing, and managing engineering assets within an organization is disclosed. The computing system includes a user management subsystem for creating a registered user profile associated with a specific user of the computing system, where the registered user profile includes user metadata that provides identifying characteristics of the specific user. The computing system includes an asset management subsystem including an asset repository for recording one or more engineering assets, where the asset management subsystem modifies the user metadata of the registered user profile in response to the specific user recording an engineering asset in the asset repository. The computing system also includes a test management subsystem including a test repository for recording one or more test bill of materials, where the test management subsystem modifies the user metadata of the registered user profile in response to the specific user recording a test bill of materials in the test repository.

In an aspect, the computing system includes a blockchain-enabled database, where the user management subsystem stores the registered user profile in the blockchain-enabled database.

In another aspect, the user management subsystem includes a tracker for determining one or more followed users have subscribed to at least one of the following: a published engineering asset and a published test bill of materials considered for subscription by the specific user associated with the registered user profile.

In yet another aspect, the tracker adds the user metadata to the registered user profile indicating at least one of the following: the published engineering asset and the published test bill of materials considered for subscription by the specific user associated with the registered user profile.

In an aspect, the user management subsystem recommends at least one of the following for subscription by the specific user associated with the registered user profile based on artificial intelligence techniques: the published engineering asset and the published test bill of materials.

In another aspect, the computing system includes a social networking platform for providing private communication within the organization.

In yet another aspect, the social networking platform publishes a list of one or more followed users that have created published engineering assets or published test bill of materials that the specific user has selected for subscription.

In an aspect, the computing system includes a rewards system that computes a fixed reward and a variable reward that are credited to the specific user.

In another aspect, the fixed reward is computed in response to determining the specific user has published material, and the variable reward is computed in response to the material being used by another user that is part of the organization.

In yet another aspect, the asset repository is an asset database that is defined by an ontology for recording the one or more engineering assets.

In an aspect, each engineering asset includes a main block including feature details and metadata describing one or more features of the engineering asset, and one or more branching blocks that are an extension of the main block.

In another aspect, the one or more branching blocks are created in response to the specific user making an update to the engineering asset.

In yet another aspect, the test repository is a test database that is defined by an ontology for recording the one or more test bill of materials.

In an aspect, the user metadata associated with the registered user profile is modified in response to the specific user recording a new test bill of materials in the test database.

In another aspect, a test bill of materials is created based on one or more of recommended published engineering assets that the specific user has selected for subscription.

In an aspect, a computing system including a cooperative system architecture for cataloging, informing, sharing, and managing engineering assets within an organization is disclosed and includes a user management subsystem for creating a registered user profile associated with a specific user of the computing system, where the registered user profile includes user metadata that provides identifying characteristics of the specific user. The computing system includes a blockchain-enabled database, where the user management subsystem stores the registered user profile in the blockchain-enabled database. The computing system also includes an asset management subsystem including an asset database for recording one or more engineering assets, where the asset management subsystem modifies the user metadata associated with the registered user profile in response to the specific user recording an engineering asset in the asset database. The computing system further includes a test management subsystem including a test database for recording one or more test bill of materials, where the test management subsystem modifies the user metadata of the registered user profile in response to the specific user recording a test bill of materials in the test database. The computing system further includes a rewards system that computes a fixed reward and a variable reward that are credited to the specific user, where the fixed reward is computed in response to determining the specific user has published material, and the variable reward is computed in response to the material being used by another user that is part of the organization. The computing system also includes a social networking platform for providing private communication within the organization.

In an aspect, the user management subsystem includes a tracker for determining one or more followed users have subscribed to at least one of the following: a published engineering asset and a published test bill of materials considered for subscription by the specific user associated with the registered user profile.

In another aspect, the tracker adds the user metadata to the registered user profile indicating at least one of the following: the published engineering asset and the published test bill of materials considered for subscription by the specific user associated with the registered user profile.

In yet another aspect, the user management subsystem recommends at least one of the following for subscription by the specific user associated with the registered user profile based on artificial intelligence techniques: the published engineering asset and the published test bill of materials.

In an aspect, a method for cataloging, informing, sharing, and managing engineering assets within an organization by a computing system is disclosed. The method includes creating a registered user profile associated with a specific user of the computing system by a user management subsystem, where the registered user profile includes user metadata that provides identifying characteristics of the specific user. The method includes recording one or more engineering assets by an asset management subsystem, where the asset management subsystem modifies the user metadata of the registered user profile in response to the specific user recording an engineering asset in an asset database. Finally, the method includes recording one or more test bill of materials by a test management subsystem, where the test management subsystem modifies the user metadata of the registered user profile in response to the specific user recording a test bill of materials in a test database.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
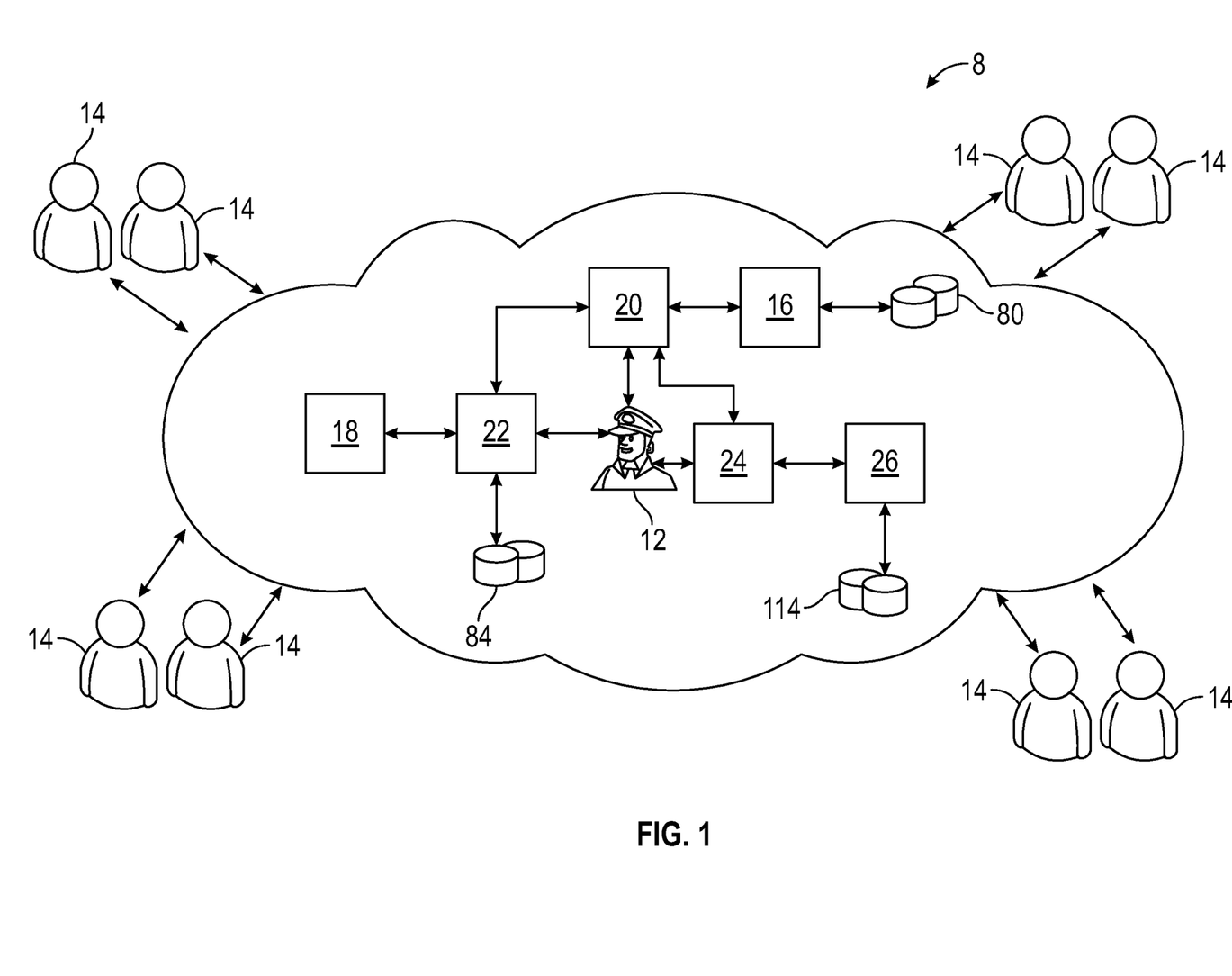
FIG. 1 is a schematic diagram of the disclosed computing system including a user management subsystem, an asset management subsystem, and a test management subsystem, according to an exemplary embodiment.

FIG. 1 is an exemplary computing system 10 that includes a cloud-based cooperative system architecture for sharing and managing engineering assets within an organization 8. The organization 8 may be, for example, a corporation that provides goods and services to consumers. In an embodiment, the organization includes one or more outside suppliers that provide products or services to the corporation. For example, in one non-limiting embodiment, the corporation is a vehicle manufacturer. In another embodiment, the corporation may be a law firm or a medical office. The computing system 10 represents any type of cloud-based computing environment including one or more server computers located in geographically diverse areas and that are interconnected by communication networks in a distributed manner. The computing system 10 is governed by an authority 12, which represents human experts, procedures, hardware, and software necessary to govern secure transactions between a plurality of users 14 of the computing system 10. The users 14 include individuals employed by either the corporation or one of the suppliers of the corporation. Some examples of the users 14 include individuals such as, but not limited to, software developers and verification and validation engineers.

The computing system 10 includes a user management subsystem 20 for creating and managing one or more registered user profiles 16 that each correspond to one of the users 14, an asset management subsystem 22 for managing one or more engineering assets 18, and a test management subsystem 24 for managing one or more test bill of materials 26. As explained below, the disclosed computing system 10 allows for the sharing of pre-developed heterogenous engineering assets 18 and test bill of materials 26, thereby reducing instances of silo culture within the organization 8 and eliminating duplicative efforts when developing assets and test scenarios. It is to be appreciated that although the disclosure describes the computing system 10 is described as managing engineering assets 18, the computing system 10 is not limited to managing engineering assets, and other types of assets may be used as well. For example, in another implementation the computing system 10 may be used in a non-engineering environment such as a law firm or a medical office. In this example, instead of engineering assets the computing system 10 manages assets such as client cases or medical reports.

Figure 2:
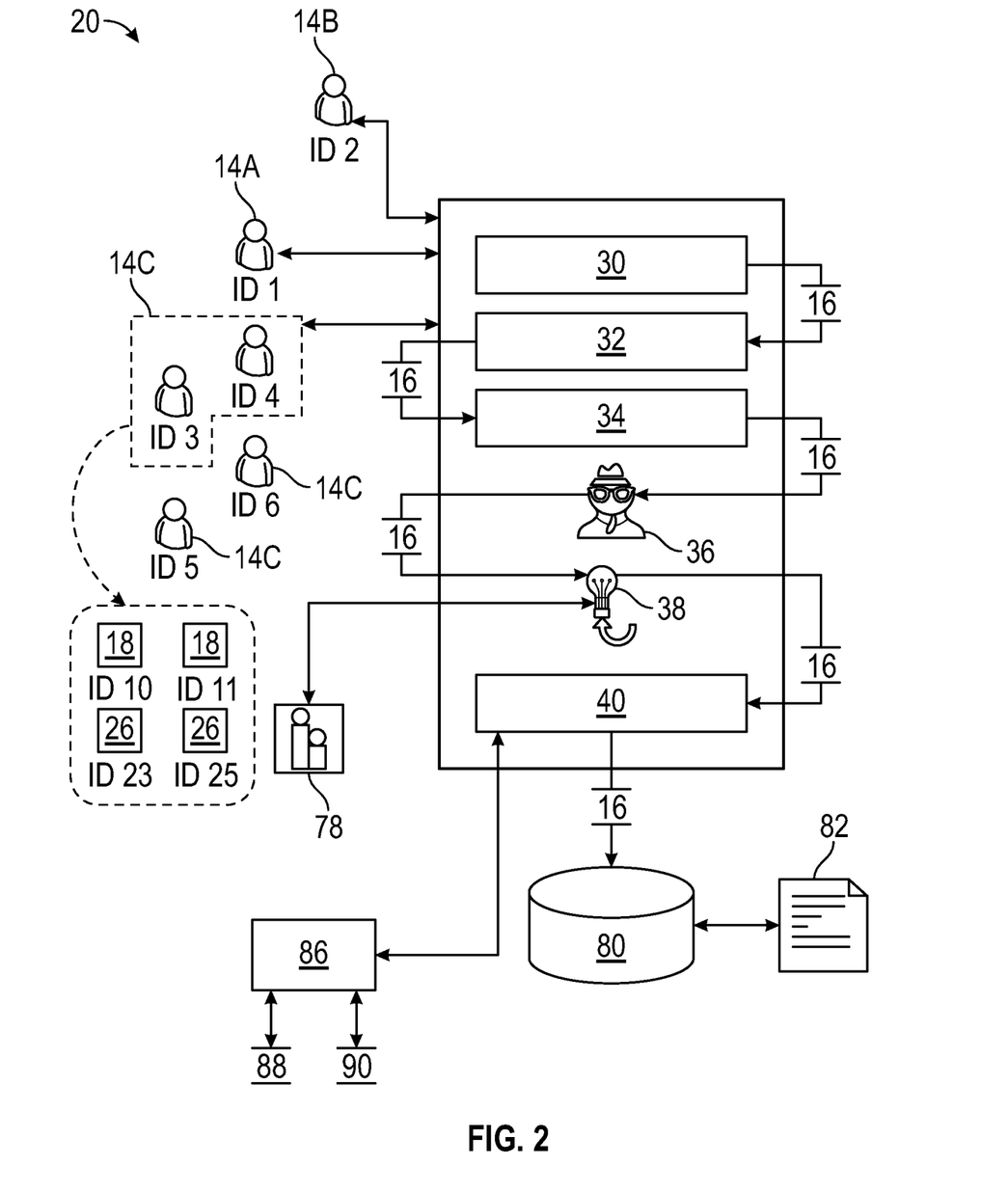
FIG. 2 is a schematic diagram of the user management subsystem shown in FIG. 1, according to an exemplary embodiment.

FIG. 2 is an illustration of the user management subsystem 20 including a registration module 30, a delegation module 32, a follower module 34, a tracker 36, a recommender 38, and a review module 40. Referring to both FIGS. 1 and 2, the user management subsystem 20 is a web-based system for creating one or more registered user profiles 16 that are stored in a blockchain-enabled database 80. The blockchain-enabled database 80 is a distributed database that is decoupled from the computer system 10. It is to be appreciated that the blockchain-enabled database 80 does not leverage a centralized authority system and a traditional certification mechanism for maintaining tracing and transaction of the user 14. The blockchain-enabled database 80 includes a distributed ledger 82 that records creation, an owner/user version, metadata modification, and profile updating of the registered user profiles 16, and assists with managing versioning of the engineering assets 18 and the test bill of materials 26 and traceability of the users 14 from the engineering assets 18 and the test bill of materials 26, and vice-versa.

The registration module 30 of the user management subsystem 20 creates a registered user profile 16 associated with a specific user 14A of the computing system 10. The registered user profile 16 includes user metadata that provides identifying characteristics of the specific user 14A. For example, in one embodiment, the identifying characteristics include one or more of the following: a user identifier that includes a unique system-assigned number, a name of the specific user 14A, a description of the specific user 14A, and a role of the specific user 14A within the computing system 10. In an embodiment, the role represents positions of increasing authority within the computing system 10. In one non-limiting embodiment, the roles include a reader, a user, a contributor, and an administrator. The reader may not contribute engineering assets 18 or test bill of materials 26, the user may create test bill of materials 26 but does not manage engineering assets 18, the contributor may create engineering assets 18 and test bill of materials 26, and the administrator has overall control of the computing system 10.

The delegation module 32 receives the registered user profile 16. In an embodiment, the delegation module 32 adds user metadata linked to a new user 14B to the registered user profile 16 associated with the specific user 14A. The user metadata indicates an identity of the new user 14B, where the new user 14B has assigned delegation rights to the specific user 14A. For example, the user metadata may indicate that the new user 14B having an ID number 2 is delegating to the specific user 14A, which has an ID number 1. The registered user profile 16 is then sent to the follower module 34. The follower module 34 determines one or more followed users 14C that the specific user 14A is following. The follower module 34 adds user metadata indicating the one or more followed users 14C that the specific user 14A is following to the registered user profile 16 associated with the specific user 14A. In one specific example, the followed users 14C include the ID numbers 3, 4, 5, and 6, and therefore the user metadata indicates that the specific user 14A is following four users 14 having the ID numbers 2, 3, 4, and 5. The registered user profile 16 is then sent to the tracker 36.

The tracker 36 determines the one or more followed users 14C have subscribed to a published engineering asset 18, a published test bill of materials 26, or both a published engineering asset 18 and a published test bill of materials 26 that is considered for subscription by the specific user 14A associated with the registered user profile 16. In other words, the tracker 36 determines one or more users 14 that are followed by the specific user 14A that have published or gone live with an engineering asset 18, a test bill of materials 26, or both within the organization 8 (FIG. 1) that is of potential interest to the specific user 14A and is being considered for subscription. The tracker 36 analyzes historical behaviors of the plurality of users 14 of the computing system 10 to extract key route information and habits of the users 14 for tracing and predicting the engineering assets 18 and the test bill of materials 26 that are considered for subscription by the specific user 14A.

The tracker 36 adds user metadata to the registered user profile 16 indicating the published engineering asset 18, the published test bill of materials 26, or both the published engineering asset 18 and the published test bill of materials 26 considered for subscription by the specific user 14A associated with the registered user profile 16. In the present example, the followed users 14 having ID numbers 3 and 4 have published engineering assets 18 or test bill of materials 26 of interest that are considered for subscription by the specific user 14A. It is to be appreciated that the specific user 14A may or may not decide to actually subscribe to the published engineering assets 18 and the published test bill of materials 26. The registered user profile 16 is then sent to the recommender 38.

The recommender 38 determines at least one published engineering asset 18, at least one published test bill of materials 26, or both a published engineering asset 18 and a published test bill of materials 26 for subscription by the specific user 14A associated with the registered user profile 16 based on one or more artificial intelligence techniques. Specifically, the recommender 38 extracts insights between the users 14, the engineering assets 18, and the test bill of materials 26, and clusters similar users 14 to recommend specific published engineering assets 18 and specific published test bill of materials 26 for subscription by the specific user 14A. The recommender 38 requires historical behavior data such as, for example, distributed blockchain based data or big data, and executes one or more artificial intelligence techniques such as, but not limited to, collaborative filtering and deep factorization techniques to determine recommendations for subscription by the specific user 14A associated with the registered user profile 16.

The recommender 38 adds user metadata indicating the published engineering asset 18, the published test bill of materials 26, or both the published engineering asset 18 and the published test bill of materials 26 that are recommended to the specific user 14A to the registered user profile 16. In one embodiment, the published engineering assets 18 and the published test bill of materials 26 are both assigned a system-assigned number. In the present example, the published engineering assets 18 having ID numbers 10 and 11 and the published test bill of materials 26 having ID numbers 23 and 25 are recommended to the specific user 14A. The specific user 14A may then select one or more of the recommended published engineering assets 18, the published test bill of materials 26, or both the published engineering asset 18 and the published test bill of materials 26 for subscription.

FIG. 2 illustrates the recommender 38 of the user management subsystem 20 is in electronic communication with an enterprise-based social networking platform 78 for providing private communication within the organization 8. The social networking platform 78 is accessible by employees of the organization 8 (FIG. 1). In an embodiment, the recommender 38 sends a notification to the social networking platform 78 indicating the specific user 14A has selected one or more of the published engineering assets 18 and the published test bill of materials 26 for subscription. In response to receiving the notification, the social networking platform 78 then publishes a list of the one or more followed users 14C that have created published engineering assets 18 and the published test bill of materials 26 that the specific user 14A has subscribed to within the organization 8 (FIG. 1).

Once the specific user 14A selects the one or more of the recommended published engineering assets 18 and/or one or more of the recommended test bill of materials 26 for subscription, the review module 40 then adds user metadata that includes reviews for subscribed published engineering assets 18 and subscribed test bill of materials 26. It is to be appreciated that the specific user 14A may also search for sets of engineering assets 18 as well. In one example, the user metadata indicates a link to the reviews for the subscribed published engineering assets 18 and the subscribed test bill of materials 26. The reviews are provided to aid a user 14 when deciding whether or not to subscribe to an engineering asset 18. The reviews may state details regarding the asset interfaces and include statements or feedback indicating how easy or difficult the asset interface was for use. In an embodiment, the reviews may also include any comments regarding improvements. It is to be appreciated that the authority governs the reviews (FIG. 1) for content and authenticity.

It is to be appreciated that the review module 40 of the user management subsystem 20 is linked to a rewards system 86 that is governed by the authority 12 (FIG. 1). The rewards system 86 computes a fixed reward 88 and a variable reward 90 that are credited to the specific user 14A. In an embodiment, the fixed reward 88 and the variable reward 90 are part of a corporate incentive program that rewards the users 14 of the organization 8 for their contributions to the computing system 10. In one embodiment, the corporate incentive program is based on a specific monetary unit such as recognition points, credits, or cryptocurrency, that are redeemed by the users 14 for goods or other incentives. For example, a user 14 may redeem the monetary units to purchase corporate merchandise or other incentives such as, for example, vacations days.

The rewards system 86 computes the fixed reward 88 in response to determining the specific user 14A has published material to the computing system 10, and the variable reward 90 is computed in response to the material being used by another user 14 that is part of the organization 8. In the present example, the fixed reward 88 is computed in response to the review module 40 determining the specific user 14A has published the review for the subscribed published engineering assets 18 and/or the subscribed test bill of materials 26, and the variable reward 90 is computed when the subscribed published engineering assets 18 and/or the subscribed test bill of materials 26 are used by another user 14 that is part of the organization. The rewards system 86 may send a reward notification to the specific user 14A, where the reward notification notifies the specific user 14A that either the fixed reward 88 or the variable reward 90 has been awarded. For example, in one embodiment, the reward notification may be an email message that is sent to the specific user 14A. The user management subsystem 20 may then store the registered user profile 16 in the blockchain-enabled database 80.

Figure 3:
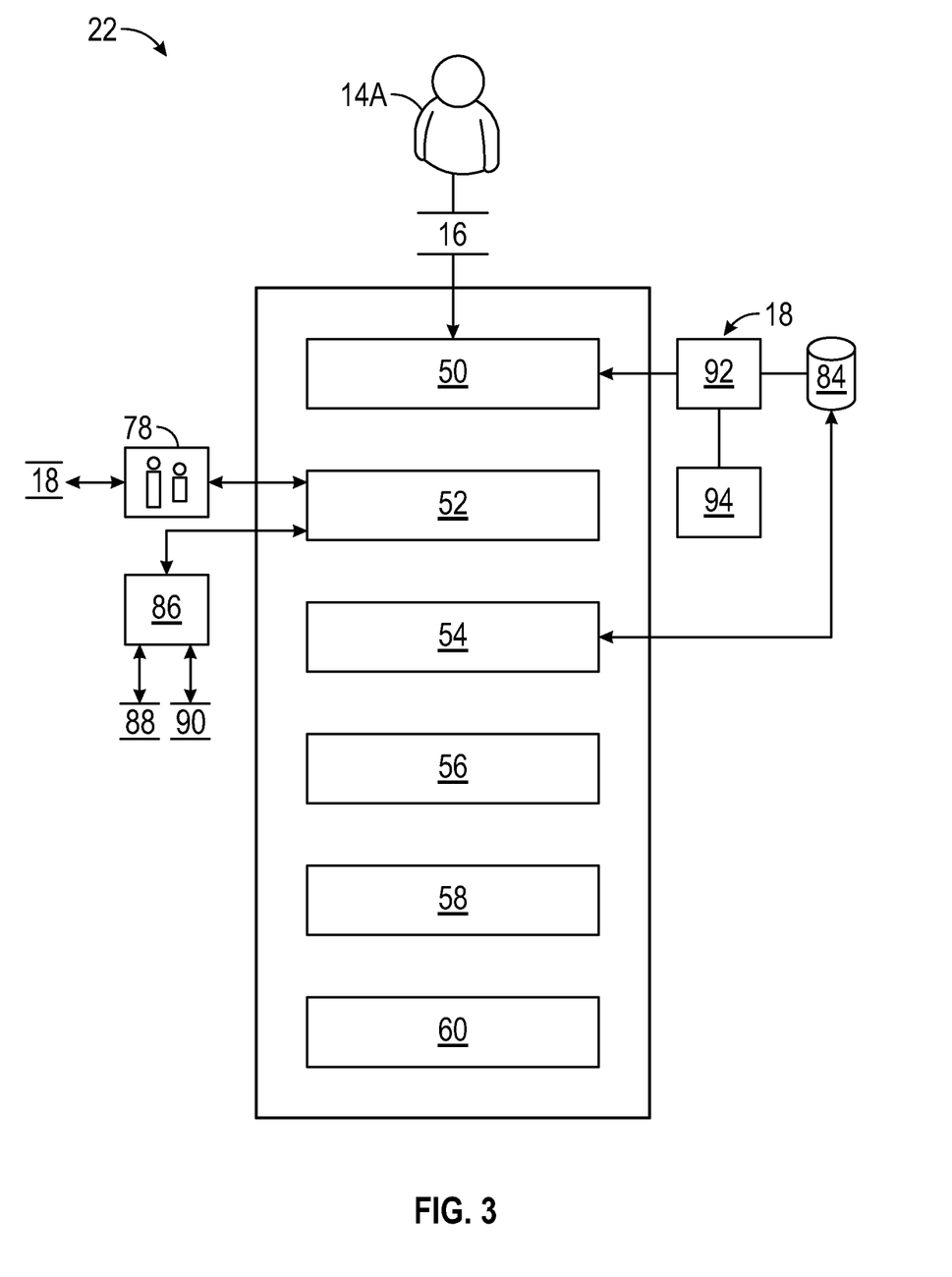
FIG. 3 is a schematic diagram of the asset management subsystem shown in FIG. 1, according to an exemplary embodiment.

FIG. 3 is an illustration of the asset management subsystem 22, which is a web-based system for one or more engineering assets 18 that are stored within an asset repository. The asset management subsystem 22 includes a recordation module 50, a publisher 52, a query module 54, a select module 56, a subscriber module 58, and a requester module 60. The asset repository is an asset database 84 that is defined by an ontology for recording one or more of the engineering assets 18, where the asset database 84 structures the engineering assets 18 based on one or more relationships. For example, the asset database 84 may include a structure defined by an ontology that defines the valid assets store in the asset database 84 (e.g. digital twins, models, physical assets, and the like) and the relationships between the assets (e.g. an asset may be built hierarchically from a set of primitive assets). For example, if owner 1 has published asset 1 and user 2 develops test scenarios or a stubbing model (that is compatible with asset 1) that are published as asset 2, then the ontology has the relationship maintained and/or managed so that both assets 1 and 2 and the associated metadata are related. Thus, potential users 14 may view all the related assets.

The asset management subsystem 22 modifies the user metadata of the registered user profile 16 in response to the specific user 14A recording either a new engineering asset 18 in the asset database 84 or updating an existing engineering asset 18 stored in the asset database 84. Specifically, when the specific user 14A either creates or updates an engineering asset 18, the recordation module 50 of the asset management subsystem 22 records the engineering asset 18 within the asset database 84 and updates the user metadata of the registered user 14A indicating the specific user 14A has recorded the engineering asset 18. In one example, the engineering asset 18 is a virtual pedestrian model that includes a unique system-assigned identification number 4. The recordation module 50 adds user metadata indicating the engineering asset 18 having the unique system-assigned identification number 4 has been recorded by the registered user profile 16.

When the engineering asset 18 is created and published, a main block 92 is created. The main block 92 includes feature details and metadata describing one or more features of the engineering asset 18. In one non-limiting embodiment, the engineering asset 18 includes metadata indicating one or more of the following: the unique system-assigned identification number, a name associated with the engineering asset 18, a description of the engineering asset 18, a name of a person that created the engineering asset 18, a state of the engineering asset, a state creation date indicting when the engineering asset 18 was entered into the computing system 10, a system-assigned indicator for indicating if the engineering asset 18 is used, a system-assigned indicator for indicating if the engineering asset has been tagged as interesting, a numeric value indicating a version, a version date, and an identifier of the parent asset. The state of the engineering asset 18 includes states such as, for example, proof-of-concept (POC), published, archived, and decommissioned.

The engineering asset 18 also includes one or more branching blocks 94 that are an extension of the main block 92, where the one or more branching blocks 94 are created in response to the specific user 14A updating the engineering asset 18. The branching block 94 includes information related to the update, and includes details such as, for example, percentage change created by the update and a weight of the update. Accordingly, it is to be appreciated that the updates to the engineering asset 18 have automatic versioning and traceability. Thus, any version of the engineering asset 18 may be cloned or used by one of the users 14.

After recording the engineering asset 18, the specific user 14A then publishes the engineering asset 18 internally within the organization 8 (FIG. 1) using the social networking platform 78. In response to determining the specific user 14A has published the engineering asset 18, the publisher 52 of the asset management subsystem 22 then updates the metadata of the engineering asset 18 indicating a state of the engineering asset 18 as published. The publisher 52 of the asset management subsystem 22 also adds metadata to the registered user profile 16 indicating that the specific user 14A has published the engineering asset 18. In the present example, the user metadata of the registered user profile 16 indicates a virtual pedestrian model having the unique system-assigned identification number 4 is published by the specific user 14A.

It is to be appreciated that the publisher 52 of the asset management subsystem 22 is linked to the rewards system 86 that is governed by the authority 12 (FIG. 1). The fixed reward 88 is computed in response to the publisher 52 determining the specific user 14A has published the engineering asset 18, and the variable reward 90 is computed when the engineering asset 18 that was published is now being used by another user 14 that is part of the organization. The rewards system 86 may send a reward notification to the specific user 14A notifying them of the fixed reward 88 and the variable reward 90. As mentioned above, in an embodiment the reward notification may be an email message.

The specific user 14A then performs a query to locate one or more engineering assets 18 that are stored in the asset database 84. In response to determining the query performed by the specific user 14A, the query module 54 generates a query to search the asset database 84 for one or more engineering assets 18. In response to determining at least one engineering asset 18 stored in the asset database 84 matches the query, the query module 54 adds user metadata to the registered user profile 16 indicating an identification number associated with the query and the unique system-assigned identification number of the one or more engineering assets 18 that match the query. For example, the identification number of the query is 10, and the engineering assets 18 that match the query include the unique system-assigned identification numbers 1, 2, and 3. As explained below, in response to the query module 54 determining that no engineering assets 18 are stored in the asset database 84 that match the query, the specific user 14A then creates a request to continuously query the asset database 84 at a given interval.

Referring to both FIGS. 2 and 3, the specific user 14A may then record interest in the one or more recommended published engineering assets 18 and/or the one or more recommended test bill of materials 26 that are of interest and are considered for subscription by the specific user 14A to the registered user profile 16 by the recommender 38 that is part of the user management subsystem 20. The select module 56 then adds user metadata to the registered user profile 16 indicating the recommended published engineering assets 18 and/or the recommended test bill of materials 26 that the specific user 14A has recorded interest in. As mentioned above and shown in FIG. 2, in the present example, the one or more recommended published engineering assets 18 having ID numbers 10 and 11 and the one or more recommended test bill of materials 26 having ID numbers 23 and 25 are recommended to the specific user 14A. In the present example, the specific user 14A expresses interest in the recommended published engineering assets 18 having ID numbers 10 and 11. Accordingly, the select module 56 adds user metadata to the registered user profile 16 indicating the specific user 14A has recorded interest in the recommended published engineering assets 18 having ID numbers 10 and 11.

After the specific user 14A records interest in the one or more recommended published engineering assets 18 and/or the one or more recommended test bill of materials 26, the specific user 14A then subscribes to one or more of the recommended published engineering assets 18 and/or the one or more recommended test bill of materials 26. The subscriber module 58 adds user metadata to the registered user profile 16 indicating the recommended published engineering assets 18 and/or the recommended test bill of materials 26 that the specific user 14A has selected for subscription. In the present example, the specific user 14A expresses interest in the recommended published engineering assets 18 having ID numbers 10 and 11, but only subscribes to the published engineering asset 18 with the ID number of 10. Therefore, the subscriber module 58 adds user metadata to the registered user profile 6 indicating that the specific user 14A has subscribed to the published engineering asset 18 with the ID number 10.

As mentioned above, in some instances the query module 54 determines that no engineering assets 18 are stored in the asset database 84 that match the query, and the specific user 14A then creates a request to continuously query the asset database 84 at a given interval. The requester module 60 adds user metadata to the registered user profile 16 with an updated query record with a change of state to indicate that the query is now performed periodically. For example, in one embodiment, the query may be executed on an hourly, daily, or weekly basis.

Figure 4:
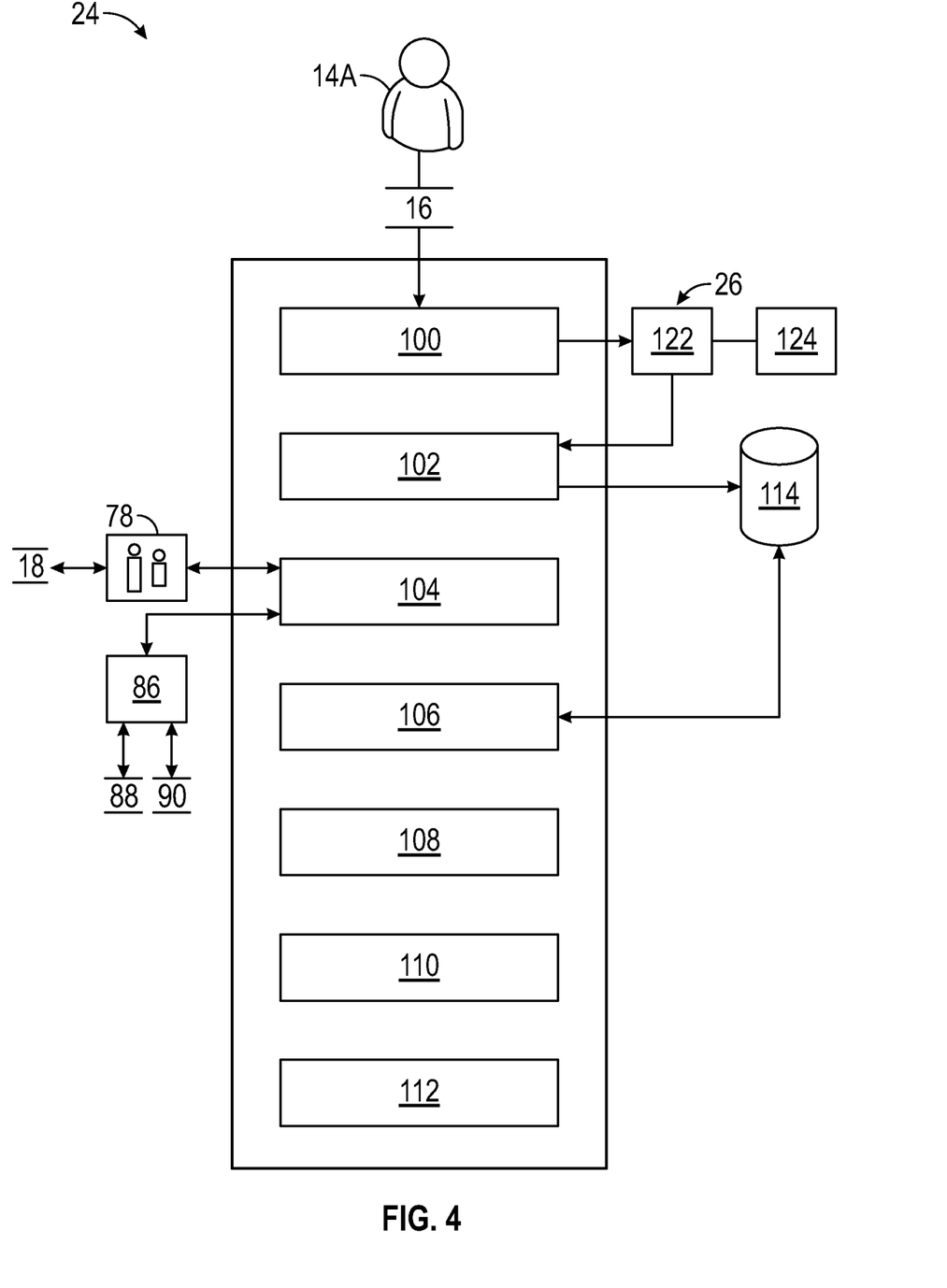
FIG. 4 is a schematic diagram of the test management subsystem shown in FIG. 1, according to an exemplary embodiment.

FIG. 4 is an illustration of the test management subsystem 24, which is a web-based system for recording, publishing, and updating one or more test bill of materials 26 that are stored within a test repository. The test management subsystem 24 includes a creation module 100, a recordation module 102, a publisher 104, a query module 106, a select module 108, a subscriber module 110, and a requester module 112. The test repository is a test database 114 defined by an ontology for recording one or more of the test bill of materials 26, where the test database 114 structures the test bill of materials 26 based on one or more relationships. For example, the test database 114 may include a structure defined by an ontology that defines the valid test bill of materials 26 stored in the test database 114 (e.g. digital twins, models, physical assets, and the like) and the relationships between the test bill of materials 26.

The creation module 100 of the test management subsystem 24 modifies the user metadata of the registered user profile 16 in response to the specific user 14A recording a new test bill of materials 26 in the test database 114. The specific user 14A creates a test bill of materials 26 based on the one or more of the recommended published engineering assets 18 and/or the test bill of materials 26 that the specific user 14A has subscribed to. As mentioned above, the subscriber module 58 of the asset management subsystem 24 adds the user metadata includes to the registered user profile 16 indicating the recommended published engineering assets and/or the recommended test bill of materials that the specific user 14A has selected for subscription. The creation module 100 of the test management subsystem 24 records the test bill of materials 26 within the test database 114.

The test bill of materials 26 includes a main block 122 that includes feature details and metadata describing one or more features of the test bill of materials 26. In one non-limiting embodiment, the test bill of materials 26 includes metadata indicating one or more of the following: the unique system-assigned identification number, a name associated with the test bill of materials 26, a description of the test bill of materials 26, a name of a person that created the test bill of materials 26, a list of user-defined tags, a status of the test case, an identification number of the parent case, a system-assigned indicator that signifies when the test bill of materials 26 is using an asset, a system assigned indicator if the test bill of materials 26 has been tagged as interesting, a numeric value indicating a version of the test bill of materials 26, a version date, and an identification number of the parent test. The state of the test case includes states such as, for example, draft, published, archived, and retired. In an embodiment, the test bill of materials 26 also includes one or more branching blocks 124 that are an extension of the main block 122, where the one or more branching blocks 124 are created in response to the specific user 14A making an update to the test bill of materials 26.

The recordation module 102 of the asset management subsystem 22 records the engineering asset 18 within the test database 114 and updates the user metadata of the registered user 14A indicating the specific user 14A has created the test bill of materials 26. After recording the test bill of materials 26, the specific user 14A then publishes the test bill of materials 26 internally within the organization 8 (FIG. 1) using the social networking platform 78. In response to determining the specific user 14A has published the test bill of materials 26, the publisher 104 of the test management subsystem 24 updates the metadata of the test bill of materials 26 indicating a state of the test bill of materials 26 to published. The publisher 104 of the asset management subsystem 22 also adds user metadata to the registered user profile 16 indicating that the specific user 14A has published the test bill of materials 26. As seen in FIG. 4, the publisher 104 of the test management subsystem 24 is linked to the rewards system 86 that is governed by the authority 12 (FIG. 1). The fixed reward 88 is computed in response to the publisher 52 determining the specific user 14A has published the test bill of materials 26, and the variable reward 90 is computed when the test bill of materials 26 that was published is now being used by another user 14 that is part of the organization.

The specific user 14A then performs a query to locate one or more test bill of materials 26 that are stored in the test database 114. In response to determining the specific user 14A has performed the query, the query module 106 generates a query to search the test database 114 for one or more test bill of materials 26. In response to determining at least one test bill of materials 26 stored in the test database 114 matches the query, the query module 106 adds user metadata to the registered user profile 16 indicating an identification number associated with the query and the unique system-assigned identification number of the test bill of materials 26 that match the query. As explained below, in response to the query module 106 determining that no test bill of materials 26 are stored in the test database 114 that match the query, the specific user 14A then creates a request to continuously query the test database 114 at a given interval.

Referring to both FIGS. 2 and 4, the specific user 14A may then record interest in the one or more recommended published engineering assets and/or the one or more recommended test bill of materials that are of interest and are considered for subscription by the specific user 14A to the registered user profile 16 by the recommender 38 that is part of the user management subsystem 20. The select module 108 then adds user metadata to the registered user profile 16 indicating the recommended published engineering assets and/or the recommended test bill of materials that the specific user 14A has recorded interest in.

After the specific user 14A expresses interest in the one or more recommended published engineering assets and/or the one or more recommended test bill of materials, the specific user 14A then subscribes to one or more of the recommended published engineering assets and/or the one or more recommended test bill of materials. The subscriber module 110 adds user metadata to the registered user profile 16 indicating the recommended published engineering assets and/or the recommended test bill of materials that the specific user 14A has subscribed to.

As mentioned above, in some instances the query module 106 determines that no test bill of materials 26 are stored in the test database 114 that match the query, and the specific user 14A then creates a request to continuously query the test database 114 at a given interval. The requester module 112 adds user metadata to the registered user profile 16 with an updated query record with a change of state to indicate that the query is now performed periodically.

Figure 5:
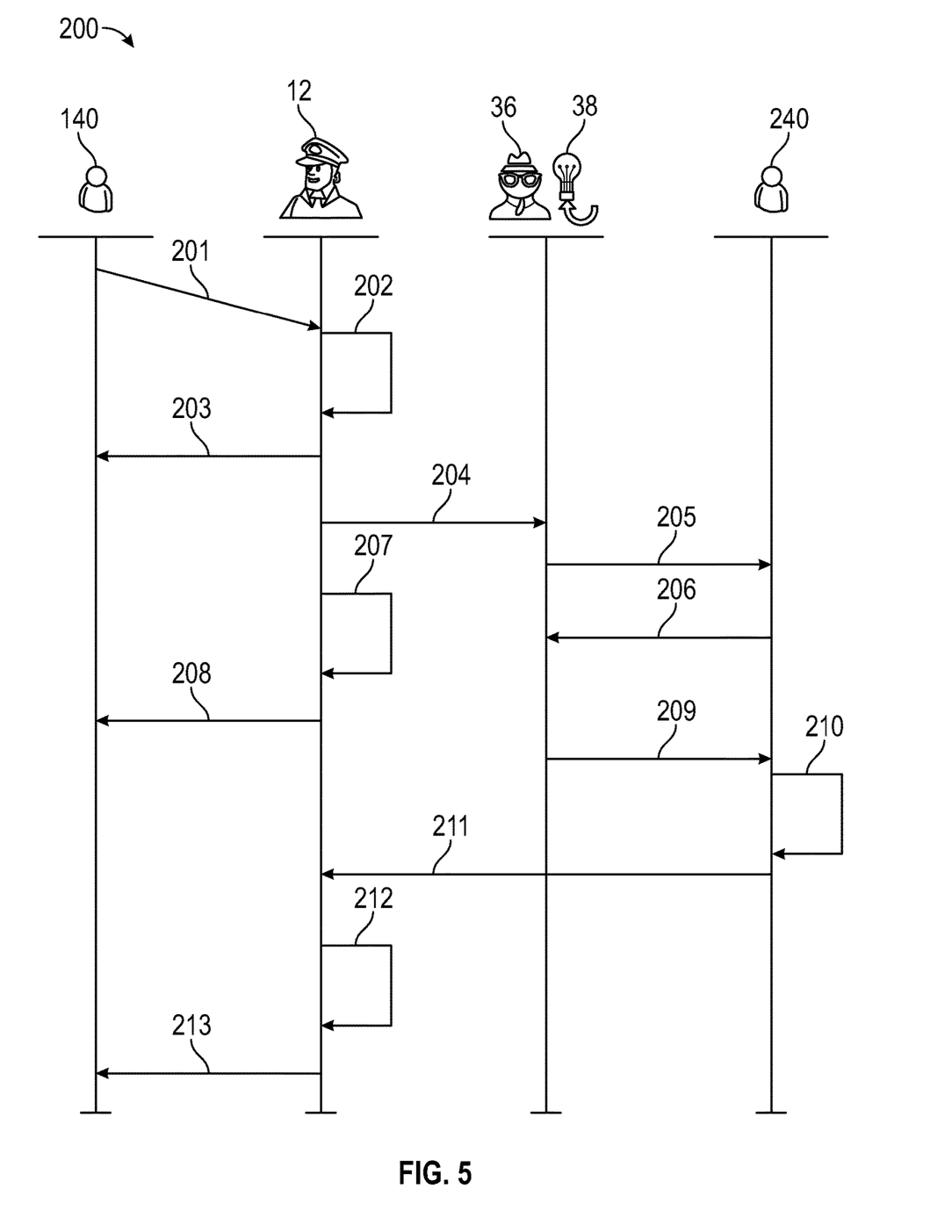
FIG. 5 is a message sequence chart illustrating an exemplary method for executing a transaction by the computing system.

FIG. 5 is a message sequence chart illustrating an exemplary method 200 for executing a transaction by the computing system 10 (FIG. 1) between a publisher 140, the authority 12, the tracker 36 and the recommender 38, and a subscriber or test creator 240. Both the publisher 140 and the subscriber or test creator 240 are users 14 of the computing system 10. It is to be appreciated that the message sequence chart shown in FIG. 5 is merely exemplary in nature and other types of dependency graphs from another perspective may exist as well.

Referring generally to FIGS. 2-5, the method 200 begins at block 201, where the publisher 140 transmits a new request to publish a new engineering asset 18, where the new request includes the metadata associated with the new engineering asset 18. The method 200 may then proceed to block 202.

In block 202, in response to receiving the new request, the authority 12 approves the new request. The authority 12 may then search, catalog, and store the new engineering asset 18 to the asset database 84 (FIG. 3). The method 200 may then proceed to block 203.

In block 203, an approval notification is sent to the publisher 140 indicating that the new request has been approved, and the new engineering asset 18 has been cataloged and stored to the asset database 84 (FIG. 3). The method 200 may then proceed to block 204.

In block 204, the authority 12 transmits the metadata and other information regarding the new engineering asset 18 to the tracker 36 and the recommender 38. The method 200 may then proceed to block 205.

In block 205, the recommender 38 determines at least one recommended published engineering asset 18 for subscription by the subscriber or test creator 240. The method 200 may then proceed to block 206.

In block 206, the subscriber or test creator 240 generates a notification indicating interest in the recommended published engineering asset 18 for subscription that is sent to the tracker 36. The method 200 may then proceed to block 207.

In block 207, the rewards system 86 computes the fixed reward 88 in response to the subscriber or test creator 240 generating the notification indicating interest in the recommended published engineering asset 18 for subscription. The method 200 may then proceed to block 208.

In block 208, the rewards system 86 transmits a reward notification to the publisher 140 indicating the fixed reward 88 has been awarded to the publisher 140. The method 200 may then proceed to block 209.

In block 209, the recommender 38 delivers the recommended published engineering asset 18 selected for subscription to the subscriber or test creator 240. The method 200 may then proceed to block 210.

In block 210, the subscriber or test creator 240 creates the test bill of materials 26 based on the one or more of the recommended published engineering assets 18 that the subscriber or test creator 240 has subscribed to. The method 200 may then proceed to block 211.

In block 211, the test bill of materials 26 created by the subscriber or test creator 240 is then reviewed and analyzed by the subscriber or test creator 240. It is to be appreciated that the review and analysis may include syntactical and semantical analysis. The method 200 may then proceed to block 212.

In block 212, in response to reviewing and analyzing the test bill of materials 26, the reward system 86 computes the variable reward 90. The method 200 may then proceed to block 213.

In block 213, the reward system 86 sends a reward notification to the publisher 140 indicating the variable reward 90 has been awarded to the publisher 140. The method 200 may then terminate.

Referring generally to the figures, the disclosed computing system provides various technical effects and benefits. Specifically, the computing system provides an approach to inform users within an organization regarding existing engineering assets and test scenarios, thereby reducing instances of duplicated engineering asset and test scenario creation. Furthermore, the disclosed computing system also provides an approach to incentivize or reward individuals for sharing their engineering assets and test scenarios within the organization. The computing system allows for users within an organization to share knowledge about pre-developed heterogenous assets and test scenarios, as well as to query and subscribe to predeveloped and published engineering assets and test scenarios. The computing system also allows a particular user to follow other users that are part of the organization, thereby allowing the particular user to receive notifications regarding engineering assets and test scenarios that have just been released or published.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A computing system including a cooperative system architecture for cataloging, informing, sharing, and managing engineering assets within an organization, the computing system comprising:
   one one or more server computers including one or more processors, wherein the one or more server computers include:
      a user management subsystem for creating a registered user profile associated with a specific user of the computing system, wherein the registered user profile includes user metadata that provides identifying characteristics of the specific user;
      a blockchain-enabled database, wherein the user management subsystem stores the registered user profile in the blockchain-enabled database;
      an asset management subsystem including an asset repository for recording one or more engineering assets, wherein the asset management subsystem modifies the user metadata of the registered user profile in response to the specific user recording an engineering asset in the asset repository;
      a test management subsystem including a test repository for recording one or more test bill of materials, wherein the test management subsystem modifies the user metadata of the registered user profile in response to the specific user recording a test bill of materials in the test repository;
      a rewards system that computes a fixed reward and a variable reward that are credited to the specific user, wherein the fixed reward is computed in response to determining the specific user has published material, and the variable reward is computed in response to the material being used by another user that is part of the organization; and
      a social networking platform for providing private communication within the organization, wherein the social networking platform publishes a list of one or more followed users that have created published engineering assets or published test bill of materials that the specific user has selected for subscription.

2. The computing system of claim 1, wherein the user management subsystem includes a tracker for determining one or more followed users have subscribed to at least one of the following: a published engineering asset and a published test bill of materials considered for subscription by the specific user associated with the registered user profile.

3. The computing system of claim 2, wherein the tracker adds the user metadata to the registered user profile indicating at least one of the following: the published engineering asset and the published test bill of materials considered for subscription by the specific user associated with the registered user profile.

4. The computing system of claim 2, wherein the user management subsystem recommends at least one of the following for subscription by the specific user associated with the registered user profile based on artificial intelligence techniques: the published engineering asset and the published test bill of materials.

5. The computing system of claim 1, wherein the asset repository is an asset database that is defined by an ontology for recording the one or more engineering assets.

6. The computing system of claim 5, wherein each engineering asset includes a main block including feature details and metadata describing one or more features of the engineering asset, and one or more branching blocks that are an extension of the main block.

7. The computing system of claim 6, wherein the one or more branching blocks are created in response to the specific user making an update to the engineering asset.

8. The computing system of claim 1, wherein the test repository is a test database that is defined by an ontology for recording the one or more test bill of materials.

9. The computing system of claim 8, wherein the user metadata associated with the registered user profile is modified in response to the specific user recording a new test bill of materials in the test database.

10. The computing system of claim 8, wherein a test bill of materials is created based on one or more of recommended published engineering assets that the specific user has selected for subscription.

11. A computing system including a cooperative system architecture for cataloging, informing, sharing, and managing engineering assets within an organization, the computing system comprising:

one one or more server computers including one or more processors, wherein the one or more server computers include:

a user management subsystem for creating a registered user profile associated with a specific user of the computing system, wherein the registered user profile includes user metadata that provides identifying characteristics of the specific user;

a blockchain-enabled database, wherein the user management subsystem stores the registered user profile in the blockchain-enabled database;

an asset management subsystem including an asset database for recording one or more engineering assets, wherein the asset management subsystem modifies the user metadata associated with the registered user profile in response to the specific user recording an engineering asset in the asset database;

a test management subsystem including a test database for recording one or more test bill of materials, wherein the test management subsystem modifies the user metadata of the registered user profile in response to the specific user recording a test bill of materials in the test database;

a rewards system that computes a fixed reward and a variable reward that are credited to the specific user, wherein the fixed reward is computed in response to determining the specific user has published material, and the variable reward is computed in response to the material being used by another user that is part of the organization; and a social networking platform for providing private communication within the organization.

12. The computing system of claim 11, wherein the user management subsystem includes a tracker for determining one or more followed users have subscribed to at least one of the following: a published engineering asset and a published test bill of materials considered for subscription by the specific user associated with the registered user profile.

13. The computing system of claim 12, wherein the tracker adds the user metadata to the registered user profile indicating at least one of the following: the published engineering asset and the published test bill of materials considered for subscription by the specific user associated with the registered user profile.

14. The computing system of claim 13, wherein the user management subsystem recommends at least one of the following for subscription by the specific user associated with the registered user profile based on artificial intelligence techniques: the published engineering asset and the published test bill of materials.

15. A method for cataloging, informing, sharing, and managing engineering assets within an organization by a computing system, the method comprising:

creating a registered user profile associated with a specific user of the computing system by a user management subsystem that is part of one or more server computers including one or more processors, wherein the registered user profile includes user metadata that provides identifying characteristics of the specific user;

storing the registered user profile in a blockchain-enabled database that is part of the one or more server computers;

recording one or more engineering assets by an asset management subsystem that is part of the one or more server computers, wherein the asset management subsystem modifies the user metadata of the registered user profile in response to the specific user recording an engineering asset in an asset database;

recording one or more test bill of materials by a test management subsystem that is part of the one or more server computers, wherein the test management subsystem modifies the user metadata of the registered user profile in response to the specific user recording a test bill of materials in a test database;

computing, by a rewards system, a fixed reward and a variable reward that are credited to the specific user, wherein the fixed reward is computed in response to determining the specific user has published material, and the variable reward is computed in response to the material being used by another user that is part of the organization; and providing, by a social networking platform, private communication within the organization, wherein the social networking platform publishes a list of one or more followed users that have created published engineering assets or published test bill of materials that the specific user has selected for subscription.

16. The method of claim 15, comprising:

determining, by a tracker of the user management subsystem, one or more followed users have subscribed to at least one of the following: a published engineering asset and a published test bill of materials considered for subscription by the specific user associated with the registered user profile.

17. The method of claim 16, comprising:

adding, by the tracker, the user metadata to the registered user profile indicating at least one of the following: the published engineering asset and the published test bill of materials considered for subscription by the specific user associated with the registered user profile.

18. The method of claim 16, comprising:

recommending, by the user management subsystem, at least one of the following for subscription by the specific user associated with the registered user profile based on artificial intelligence techniques: the published engineering asset and the published test bill of materials.

19. The computing system of claim 11, wherein the asset database is defined by an ontology for recording the one or more engineering assets.

20. The computing system of claim 11, wherein the test database is defined by an ontology for recording the one or more test bill of materials.

* * * * *